United States Patent
Khan et al.

(10) Patent No.: US 9,701,914 B2
(45) Date of Patent: Jul. 11, 2017

(54) ADVANCED CONTROL OF SEVERE FLUID CATALYTIC CRACKING PROCESS FOR MAXIMIZING PROPYLENE PRODUCTION FROM PETROLEUM FEEDSTOCK

(75) Inventors: M. Rashid Khan, Dhahran (SA); Othman A. Taha, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 241 days.

(21) Appl. No.: 11/983,078

(22) Filed: Nov. 7, 2007

(65) Prior Publication Data

US 2008/0128325 A1 Jun. 5, 2008

Related U.S. Application Data

(60) Provisional application No. 60/857,300, filed on Nov. 7, 2006.

(51) Int. Cl.
*C10G 11/18* (2006.01)
*B01J 23/10* (2006.01)
(Continued)

(52) U.S. Cl.
CPC ............. *C10G 11/187* (2013.01); *B01J 23/10* (2013.01); *B01J 29/80* (2013.01); *C10G 11/05* (2013.01);
(Continued)

(58) Field of Classification Search
CPC ...... C10G 11/18; C10G 11/182; C10G 11/187
(Continued)

(56) References Cited

U.S. PATENT DOCUMENTS

| 2,626,233 | A | * | 1/1953 | Gladrow et al. | ............. 208/113 |
| 3,074,878 | A | | 1/1963 | Pappas | |

(Continued)

FOREIGN PATENT DOCUMENTS

| EP | 315179 B1 | 10/1991 |
| EP | 1273342 A | 1/2003 |

(Continued)

OTHER PUBLICATIONS

Haurani et al., Multivariable Control of a Paper Coloring Process: a Case Study, Proceedings of the American Control Conference, Arlington, VA, Jun. 25-27, 2001, pp. 2210-2215.

(Continued)

*Primary Examiner* — Michelle Stein
(74) *Attorney, Agent, or Firm* — Bracewell LLP; Constance Gall Rhebergen

(57) ABSTRACT

With an aim to optimize propylene production, petroleum oil such as gas oil is catalytically cracked by contacting the oil with catalyst mixture consisting of a base cracking catalyst containing an stable Y-type zeolite and small amounts of rare-earth metal oxide, and an additive containing a shape-selective zeolite, in a down-flow type fluid catalytic cracking apparatus having a regeneration zone, a separation zone, and a stripping zone, wherein conversion of hydrocarbon occurs under relatively severe conditions. According to this fluid catalytic cracking process, the production of light-fraction olefins such as propylene is maximized by applying appropriate process control, monitoring, and optimizing systems. Process model and historical data to test a predictive system can provide early warning of potential performance degradation and equipment failure in the FCC unit.

18 Claims, 4 Drawing Sheets

(51) Int. Cl.
*B01J 29/80* (2006.01)
*C10G 11/05* (2006.01)
*G05D 21/02* (2006.01)
*B01J 29/08* (2006.01)
*B01J 29/40* (2006.01)

(52) U.S. Cl.
CPC .............. *G05D 21/02* (2013.01); *B01J 29/084* (2013.01); *B01J 29/40* (2013.01); *C10G 2300/1033* (2013.01); *C10G 2300/1044* (2013.01); *C10G 2300/1059* (2013.01); *C10G 2300/1074* (2013.01); *C10G 2300/4006* (2013.01); *C10G 2300/4081* (2013.01); *C10G 2400/20* (2013.01)

(58) Field of Classification Search
USPC ..... 208/67, 113, 120.01, 114, 121; 364/151, 364/164; 502/64, 66, 68
See application file for complete search history.

(56) References Cited

U.S. PATENT DOCUMENTS

| | | | |
|---|---|---|---|
| 3,175,968 | A | 3/1965 | Berger |
| 3,213,014 | A | 10/1965 | Atkinson |
| 3,629,097 | A | 12/1971 | Smith |
| 3,728,526 | A | 4/1973 | Youngblood |
| 3,828,171 | A | 8/1974 | Griffin |
| 4,092,722 | A | 5/1978 | Hofferber et al. |
| 4,144,189 | A | 3/1979 | Kirkbride |
| 4,243,630 | A | 1/1981 | Kliesch et al. |
| 4,345,993 | A | 8/1982 | Stewart |
| 4,354,957 | A | 10/1982 | Swindell et al. |
| 4,419,221 | A | 12/1983 | Castagnos, Jr. et al. |
| 4,437,977 | A | 3/1984 | Funk |
| 4,532,026 | A | 7/1985 | Fries |
| 4,929,337 | A * | 5/1990 | Herbst et al. ............ 208/120.01 |
| 4,980,053 | A | 12/1990 | Li et al. |
| 4,992,614 | A | 2/1991 | Rodewald |
| 5,073,349 | A | 12/1991 | Herbst et al. |
| 5,298,155 | A | 3/1994 | Sabottke |
| 5,322,619 | A | 6/1994 | Davis et al. |
| 5,326,465 | A | 7/1994 | Yongqing et al. |
| 5,402,333 | A * | 3/1995 | Cardner ........................ 700/31 |
| 5,462,652 | A | 10/1995 | Wegerer |
| 5,774,381 | A | 6/1998 | Meier |
| 5,846,402 | A | 12/1998 | Mandal et al. |
| 5,904,837 | A * | 5/1999 | Fujiyama .................... 208/164 |
| 5,951,850 | A | 9/1999 | Ino et al. |
| 6,045,690 | A | 4/2000 | Fujiyama et al. |
| 6,093,867 | A | 7/2000 | Ladwig et al. |
| 6,566,293 | B1 * | 5/2003 | Vogt et al. ...................... 502/67 |
| 6,656,346 | B2 | 12/2003 | Ino et al. |
| 6,835,302 | B2 | 12/2004 | Cammy et al. |
| 7,122,495 | B2 | 10/2006 | Ou et al. |
| 7,145,051 | B2 | 12/2006 | Ou et al. |
| 2002/0195373 | A1 | 12/2002 | Ino et al. |
| 2003/0065408 | A1 | 4/2003 | Quinones et al. |
| 2004/0099572 | A1* | 5/2004 | Evans ........................ 208/113 |
| 2004/0215697 | A1 | 10/2004 | Vergopoulos et al. |
| 2005/0209093 | A1 | 9/2005 | Chester et al. |
| 2005/0261534 | A1 | 11/2005 | Stell et al. |
| 2006/0074571 | A1 | 4/2006 | Evans |
| 2006/0178546 | A1 | 8/2006 | Mo et al. |
| 2006/0260981 | A1 | 11/2006 | Gosling |
| 2007/0032374 | A1 | 2/2007 | Lau et al. |
| 2007/0227351 | A1 | 10/2007 | Garcia-Martinez |
| 2007/0299619 | A1 | 12/2007 | Marik et al. |
| 2008/0078694 | A1 | 4/2008 | Sexton et al. |
| 2009/0095657 | A1 | 4/2009 | Taha et al. |
| 2010/0025297 | A1 | 2/2010 | Vierheilig |

FOREIGN PATENT DOCUMENTS

| | | |
|---|---|---|
| JP | 7506389 | 7/1995 |
| JP | 2002241764 A | 8/2002 |
| JP | 2002241764 A1 | 8/2002 |
| WO | 2004065005 A1 | 8/2004 |
| WO | 2006050487 A | 5/2006 |
| WO | 2008057546 A9 | 5/2008 |

OTHER PUBLICATIONS

Taha et al., Detection and Diagnosis of Oscillations in Control Loops, Proceedings of the 35th Conference on Decision and Control, Kobe, Japan, Dec. 1996, pp. 2432-2437.

White, D. C., "Creating the 'smart plant'", Hydrocarbon Processing, Oct. 2003, pp. 41-50, vol. 82, No. 10, XP-002507804.

"FCCU advanced control", Hydrocarbon Processing, Feb. 1986, pp. 71-74, vol. 65, No. 2, Houston, TX, USA.

S. S. Al-Alloush, Gene Yeh, A. M. Aitani, "Overview of catalyst management and selection protocols at Saudi Aramco refineries", SA Journal of Technology 2006.

T. Chakravarty, M. R. Khan, H. L. C. Meuzelaar, "Modeling and Predicting the Composition of Fossil Fuel Derived Pyrolysis Liquids by Using Low-Voltage Mass Spectrometry and Canonical Correlation Analysis", 1990, pp. 2173-2180, vol. 29, Ind. Eng. Chem. Res.

T. Chakravarty, W. Windig, G. R. Hill, H. L. C. Meuzelaar, "Time-Resolved Pyrolysis Mass Spectrometry of Coal: A New Tool for Mechanistic and Kinetic Studies", Energy & Fuels, 1988, pp. 400-405, vol. 2.

M. R. Khan, K. H. Kumar, "Pseudocomponent Model for Prediction of Molecular Weight Distribution of Pyrolysis Liquids Generated at Slow and Rapid Heating Rate Reactors", Energy & Fuels, 1989, pp. 312-315, vol. 3.

M. R. Khan, "Correlations between Physical and Chemical Properties of Pyrolysis Liquids Derived from Coal, Oil Shale, and Tar Sand", Energy & Fuels, 1988, pp. 834-842, vol. 2.

A. Chica, K. G. Strohmaier, E. Iglesia, "Effects of zeolite structure and aluminum content on thiophene adsorption, desorption, and surface reactions", Applied Catalysis B: Environmental, 2005, pp. 231-240, vol. 60.

International Search Report for PCT/US2009/063410 dated Feb. 26, 2010.

International Search Report for PCT/US2007/023405 dated Jan. 12, 2009.

International Search Report and Written Opinion issued in PCT Application No. PCT/US11/37182 dated Aug. 16, 2011 (13 pages).

* cited by examiner

ADVANCED CONTROL OF SEVERE FLUID CATALYTIC CRACKING PROCESS FOR MAXIMIZING PROPYLENE PRODUCTION FROM PETROLEUM FEEDSTOCK

RELATED APPLICATIONS

This application is related to and claims priority and benefit of U.S. Provisional Patent Application Ser. No. 60/857,300, filed Nov. 7, 2006, titled "Advanced Control of Severe Fluid Catalytic Cracking Process for Maximizing Propylene Production from Petroleum Feedstock," which is incorporated herein by reference in its entirety.

BACKGROUND OF THE INVENTION

1. Field of the Invention

This invention relates to a process for catalytic cracking of petroleum oil. More particularly, it relates to the application of appropriate control and monitoring conditions to a fluid catalytic cracking ("FCC") process operating at relatively high severity conditions, which includes cracking of petroleum oil to obtain a maximum yield of a light olefin such as propylene, thereby maximizing propylene production per unit of hydrocarbon feed.

2. Description of the Prior Art

Although steam pyrolysis is widely practiced in process of cracking petroleum oil, this process is energy intensive, not very selective, produces coke and releases significant amounts of carbon dioxide into the air. Chemical manufacturers have long recognized a need for an alternative hydrocarbon cracking process. One alternative to steam pyrolysis process is a catalytic cracking process.

In a typical catalytic cracking unit, petroleum-derived hydrocarbons are catalytically cracked with a catalyst to obtain gasoline as the main product, a small amount of LPG, and cracked gas oil. Coke deposited on the catalyst is then burnt away with air to recycle the regenerated catalyst for reuse In a typical FCC process light olefin selectivity may be increased by increasing the reaction temperature which causes an increase in the contribution of thermal cracking and, thus, leads to increased formation of lighter products. For instance, in a specific type of FCC process, referred to as a Deep Catalytic Cracking ("DCC") process, higher temperatures and increased amounts of steam are used. However, thermal cracking in the DCC process is not very selective and produces large amounts of products of relatively little value, such as hydrogen, methane, ethane, and ethylene, in the "wet gas" (which contains $H_2$ and $C_1$-$C_4$ products). Wet gas compression often limits refinery operation.

Another way to increase light olefin selectively is to include an olefin-selective zeolite-containing additive such as a ZSM-5-containing additive in the process. Conventional additives such as ZSM-5 selectively convert primary cracking products (e.g., gasoline olefins) to $C_3$ and $C_4$ olefins. Improvement of the activity or the selectivity with phosphorus is known to increase the effectiveness of ZSM-5. However, the additives may dilute the catalyst inventory and decrease bottoms conversion.

The known FCC methods cannot produce sufficient light-fraction olefins selectively. For example, the high-temperature cracking reaction will result in a concurrent thermal cracking of petroleum oils, thereby increasing the yield of dry gases from feedstock oils.

The reaction of feed oil with a catalyst during short contact time cause a decrease of conversion of light-fraction olefins to light-fraction paraffins due to its inhibition of a hydrogen transfer reaction. During the short contact time reactions, the conversion of petroleum oils to light-fraction oils are not greatly increased. Furthermore, the use of pentasil-type zeolites only enhance the yield of light-fraction hydrocarbons by excessive cracking of the gasoline, once it is produced. Therefore, it is difficult to produce light-fraction olefins from heavy fraction oils in a high yield by using either of these known techniques. Therefore, there is a need to use a new method to optimize production conditions where the reaction time is optimized with a view to produce certain desired end products.

Further, in general, the difficulty in FCC is that the reactor and stripper temperatures should be maximized where as the regenerator temperature is to be minimized. Controlling temperature in this manner, does not effectively occur in conventionally heat balanced operations because any increase in the reactor temperature essentially leads to an increase in the regenerator temperature also. Therefore, a need exists for appropriate control systems that allow appropriate heat-balances in a FCC unit.

Additionally, in typical FCC processes, the catalyst is manually augmented during the refining process to control the emissions and product mix. In other words, there is no systematic feedback mechanism for optimizing such a manual process.

Due to the uncertain chemical make-up of the feedstock entering the FCC system, both the emissions and the product mix may vary or drift from process targets during the course of refining. As a result, system operators must closely monitor system outputs and to be constantly available to make manual adjustments to the catalyst injection schedule as needed. Operating in this manner causes a significant challenge if the system operates under severe conditions. Thus, it would be beneficial to be able to remotely monitor and control the overall process and allow the process model to advise adjustments through catalyst injections to the system outputs while reducing the reliance on human interactions such as monitoring and manual changes to the catalyst injection schedule.

Moreover, the process variables are not necessarily optimized in existing FCC processes for maximizing conversion of propylene, especially if the FCC operates at a severe mode. An optimum conversion level corresponding to a given feed rate, feed quality, set of processing objectives and catalyst at other unit constraints (e.g., wet gas compressor capacity, fractionation capacity. air blower capacity, reactor temperature, regenerator temperature, catalyst circulation). Therefore, the operator must manually adjust several variables at the same time, making the task nearly impossible because of the lack of suitable automation process equipment that can be readily used to optimize such performance.

SUMMARY OF THE INVENTION

The prior art systems are aimed at systems that focused on gasoline making, and therefore were not optimized for production of light olefins, such as for example, propylene. Therefore, in one aspect, the invention is a process for producing a relatively light olefin. In particular, one of the objectives of this invention is to present a mechanism to optimize propylene production.

As disclosed herein, a fluid catalytic cracking unit, appropriately modified in accordance with the teachings herein for optimum propylene production, can be utilized to produce light-fraction olefins. Utilization of such a fluid catalytic cracking unit can be economically advantageous, particularly in an oil refinery which is highly integrated with a petrochemical industry.

As noted above, zeolite materials, such as zeolite ZSM-5, have been publicized as hydrocarbon conversion catalysts. In one aspect, the present invention is directed to specific uses of a combination of zeolite catalyst systems for selectively cracking hydrocarbon materials to produce light olefins by introducing advanced control system to optimize catalysts flow into the reactor, utilizing various sensors to monitor on-line feed and composition, and utilizing statistical models to optimize propylene production. To Applicant's knowledge, none of the previous attempts of hydrocarbon cracking, especially for the formation of propylene, addressed these features.

In one aspect, the invention relates to FCC processes for maximizing production of light olefins, particularly propylene, by utilizing a cracking catalyst comprising both large and medium pore, shape-selective zeolite components, and the use of advanced process control and optimization systems. The FCC feed can be catalytically cracked to produce a cracked material which comprises naphtha and propylene, and can include recovery and the subsequent recycle of at least a portion of the cracked material as feed, in which it is catalytically cracked under relatively severe operating conditions into products comprising additional propylene. In this manner, propylene production per unit of hydrocarbon feed can be maximized, by using the advanced process control.

Another objective of this invention is to provide an improved catalytic process for the fluid catalytic cracking of petroleum oil, which can produce light-fraction olefins with a high yield, while producing a diminished amount of dry gases such as gaseous hydrogen, methane, and ethane generated by the thermal cracking of the oil by appropriate process automation and control. In one aspect, this objection can be achieved through the use of a downer reactor or down-flow FCC reactor to reduce back mixing. Back mixing is the primary reason of overcracking which results in the formation of a large amount of dry gas. The reduction of back mixing reduces coke and dry gas formation resulting in increased production of gasoline and propylene.

In an attempt to mainly raise the yield of light-fraction olefins, fluid catalytic cracking of a petroleum oil is performed at a high temperature and at a short contact time by contacting the petroleum oil with a catalyst mixture. The catalyst mixture preferably includes a specific base cracking catalyst and an additive containing a shape-selective zeolite. The application of advanced control systems to maximize propylene production with minimum costs are also preferably utilized as part of the FCC process.

In one specific embodiment, the process for fluid catalytic cracking of petroleum oil according to this invention includes the step of contacting the petroleum oil with a catalyst mixture. The catalyst mixture comprises 60 to 95 wt % of a base cracking catalyst containing an "ultra" stable Y-type zeolite, less than 0.5 wt % of rare-earth metal oxide, and 5 to 40 wt % of an additive containing a shape-selective zeolite. In one specific embodiment, the catalyst may include a phosphorus component which was prepared ex-situ. Optionally, commercially available catalyst mixtures can be used to achieve the same results.

The oil and the catalyst mixture are contacted in a fluid catalytic cracking apparatus having a regeneration zone, a down flow-type reaction zone, a separation zone, and a stripping zone. The oil and catalyst mixture can be contacted under conditions so that the reaction zone outlet temperature is over 580° C., the catalyst/oil ratio is in the range of 15 to 40 wt/wt, and the contact time of hydrocarbons in the reaction zone is in the range of 0.1 to 2.5 seconds. Each of the foregoing variables, e.g., catalyst mixture, outlet temperature, catalyst/oil ratio, and contact time, can be computer controlled by an advanced process control system to maximize propylene production at minimum expenses, i.e., for optimum propylene production.

In particular, catalyst injections and other operating conditions can be remotely monitored and automatic adjustments can be made to the system outputs, thus reducing the reliance on human interactions such as monitoring and manual changes to the catalyst injection schedule and other process variables. A portion of unconverted oil can be recycled with feed.

Another objective of the proposed invention is to maximize the yield of light-fraction olefins by fluid catalytic cracking of a petroleum oil at a high temperature and at a short contact time, wherein the petroleum oil is contacted with a catalyst mixture that consists of a specific base cracking catalyst and an additive containing a shape-selective zeolite. Maximizing the yield of light-fraction olefin can also be obtained in accordance with one aspect of the invention by application of advanced control systems to maximize propylene production with minimum costs.

Yet another objective of the invention is to identify the most appropriate combinations of catalysts for the desired purpose, namely propylene production.

Yet another objective of the invention is to use statistical models and rigorous model to facilitate automation of the control systems to optimize propylene production.

Yet another objective of the invention is to select different models to accommodate different scenarios and to be able to switch between models based on process needs with an aim to optimize propylene production.

BRIEF DESCRIPTION OF THE DRAWINGS

These and other features of the present invention are more fully set forth in the following description of illustrative embodiments of the invention. The description is presented with reference to the accompanying drawing in which.

Figure 1:
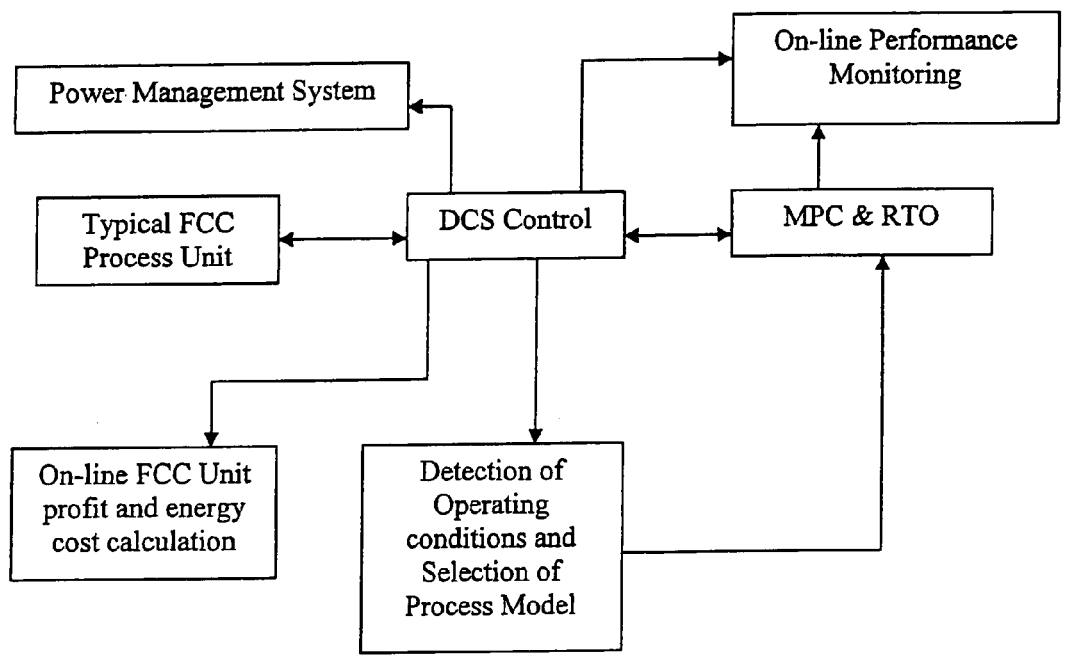
FIG. 1 is a schematic diagram of a generic fluid catalytic cracking process equipped with various control systems in accordance with one specific embodiment of the present invention.

While the invention will be described in connection with the preferred embodiment, it will be understood that it is not intended to limit the invention to that embodiment. On the contrary, it is intended to cover all alternatives, modifications, and equivalents, as can be included within the spirit and scope of the invention as defined in the appended claims.

DETAILED DESCRIPTION OF THE INVENTION

Feedstock.

In the fluid catalytic cracking of this invention, petroleum oil is used as feed oil. Petroleum oil includes straight-run gas oil, vacuum gas oil, atmospheric residue, vacuum residue, coker gas oil, and petroleum oils obtained by hydrofining or hydrotreating said residues and gas oils. These aforementioned petroleum oils may be used singly or as a mixture thereof, with a minor portion of light fraction oil.

The FCC feed can be catalytically cracked to produce a cracked material which includes naphtha and propylene, with recovery and recycle of at least a portion of the naphtha cracked material as feed into a downer for further catalytic cracking into products, including additional propylene. While the naphtha cracked material passed into the downer may include the entire naphtha fraction in the practice of the invention, it has been found that more propylene-containing light olefins can be produced per unit of naphtha cracked feed passed into additional reactor units.

In another embodiment, FCC feed can be heavy oil or residue which is more difficult to crack compared to naphtha feedstock, for example, and generally requires a higher temperature. However, one needs to keep in mind that for a given feedstock type, for example, olefinic naphtha versus paraffinic naphtha, the later is hard to crack and requires a high temperature.

Naphtha is one of the many possible feedstocks for this process. As used herein, naphtha is defined as hydrocarbon feedstock that includes hydrocarbons having about three to about twenty carbon atoms. Preferably, the naphtha feedstock includes paraffinic and isoparaffinic hydrocarbons having about four to about eleven carbon atoms per molecule.

The feedstock preferably flows into a reactor containing a catalyst, such as a pentasil zeolite catalyst. The presence of olefins in the system can be beneficial as these compounds can promote free radical reactions. In addition, various hydrocarbons such as gas oil (boiling range 260° C.-340° C.), fuel oil with a boiling point above 340° C., or even residue or the corresponding hydrotreated materials can serve suitable feedstocks.

In another embodiment, the hydrocarbon feedstock can include a certain amount of sulfur content. Most hydrocarbon oil, depending on pretreatment and processing, contains sulfur at a concentration of less than one percent. Therefore, in one aspect, the FCC process can convert sulfur containing hydrocarbons into value added products, such as for example, propylene.

Concentration of Active Sites or Activity of Available Sites; Catalyst Design. A catalyst's physical and chemical properties contribute to increased conversion through selectivity differences. These include zeolite type, pore size distribution, relative matrix to total surface area, and chemical composition. The amount of catalyst used, i.e., catalyst/oil ratio, can be significant for maximum olefins production.

Propylene production by a fluid catalytic cracking unit ("FCCU") employing a large pore zeolite cracking catalyst produces more propylene by adding a cracker riser/downer and a medium pore zeolite catalytic component to the unit, and recycling at least a portion of the cracked material to the cracker riser/downer. The large pore size zeolite preferably includes a USY zeolite and the medium pore size is preferably ZSM-5, both of which are commercially available from sources to known to persons of ordinary skill in the art.

At least a portion of the hydrocarbon is converted to produce an olefin having about two to about three carbon atoms per molecule. The large pore zeolite component is preferably a faujasite type and more preferably a Y type faujasite. The medium pore zeolite component is preferably a ZSM-5 type. In addition to the large and medium pore size zeolite components, the catalyst may also include at least one porous, inorganic refractory metal oxide as a binder. In certain embodiments, it is preferred that the binder have acid cracking functionality for cracking the heavier components of the FCC feed and that the medium pore size zeolite component comprise at least 1 wt % of the catalyst on a total weight basis.

In another embodiment, the catalyst can include particles having the large pore size zeolite with a porous, inorganic refractory metal oxide binder, and particles having the medium pore size zeolite with a porous, inorganic refractory metal oxide binder. In another embodiment, the zeolite-containing catalyst can include at least 0.5 wt % to about 10 weight percent phosphorus and about 0.1 to about 10 weight percent of a promoter metal selected from the group consisting of gallium, germanium, tin, and mixtures thereof.

In certain embodiments, the zeolite can be treated with up to about 10 wt % of the phosphorus-containing compound, (calculated as $P_2O_5$) based on the total amount of olefin-selective zeolite, to ensure proper light olefin selectivity. After treatment with the phosphorus-containing compound, the phosphorous treated olefin-selective zeolite can be dried and subsequently calcined at a temperature between 300° C. and 1000° C., preferably between 450 and 700° C. for about 15 minutes to 24 hours, to prepare the suitable olefin-selective "cracking catalyst."

The catalysts, on which carbonaceous materials and a portion of heavy hydrocarbons may be deposited, are forwarded from the stripping zone to the regenerating zone. In the regenerating zone, the catalysts, on which the carbonaceous materials and the like are deposited, are subjected to oxidation treatment, to decrease the amount of the deposits, thereby obtaining regenerated catalysts. These regenerated catalysts are continuously recycled back to the reaction zone. The cracked products are quenched just upstream of, or just downstream of, the separator, to avoid unnecessary further cracking or excessive cracking.

In certain embodiments, the catalyst mixture consists of a base cracking catalyst and an additive. The base cracking catalyst can include a stable Y-type zeolite which is the main active component of the base catalyst, and a matrix which is a substrate material for the zeolite. The base cracking catalyst can include less than 0.5 wt % of rare-earth metal oxide that is mainly included in the ultra stable Y-type zeolite. Generally, the catalytic activity of stable Y-type zeolites increases as the rare-earth metal content in the zeolites increases because thermal stability of the ultra stable Y-type zeolite is improved by incorporating rare-earth metal into the zeolites.

Hydrogen transfer reaction activity of Y-type zeolites can also be increased by adding rare-earth metal to the zeolites. The content of the stable Y-type zeolite in the base cracking catalyst used in this invention is preferably in a range of 5 to 50 wt %, and more preferably in the range of 15 to 40 wt %. The term "stable" Y-Type zeolite includes such zeolite material such as "ultrastable" zeolitic materials.

The matrix of the base cracking catalyst used in this invention may include clays such as kaolin, montmorilonite, and bentonite, and inorganic porous oxides such as alumina, silica, magnesia, and silica-alumina. The base cracking catalyst preferably has a bulk density of 0.5 to 1.0 g/ml, an average particle diameter of 50 to 90 microns, a surface area of 50 to 350 m$^2$/g and a pore volume of 0.05 to 0.5 ml/g.

The catalyst mixture contains, in addition to the base cracking catalyst, an additive containing a shape-selective zeolite. The shape selective zeolite referred to herein means a zeolite whose pore diameter is smaller than that of Y-type zeolite, so that hydrocarbons with only limited shape can enter the zeolite through its pores. Exemplary shape-selective catalysts can include: ZSM-5, omega, SAPO-5, and aluminosilicates. ZSM-5 zeolite is most preferably used in this invention, among these shape-selective zeolites. The content of the shape-selective zeolite in the additive can be in the range of 20 to 70 wt %, and more preferably in the range of 30 to 60 wt %.

A percentage of the base cracking catalyst in the catalyst mixture can be in a range of 55 to 95 wt % and a percentage of the additive in the catalyst mixture can be in a range of 5 to 40 wt %. If the percentage of the base cracking catalyst is less than 55 wt % or the percentage of additive is greater than 40 wt %, high light-fraction olefin yield cannot be obtained, because of low conversions of the feed oil. If the percentage of the base cracking catalyst is greater than 95 wt %, or the percentage of the additive is less than 5 wt %, very high light-fraction olefin yield cannot be obtained, while high conversion of the feed oil can be achieved. In a particularly preferred embodiment, the catalyst contains at least 0.5 wt % phosphorous, typically present as $P_2O_5$.

In this invention, commercially available cracking catalysts, such as for example, OCTACAT (W. R. Grace Co., Ltd.) can be used. The OCTACAT catalyst contains a zeolite having a crystal lattice constant of 24.50 ANG. Other suitable commercially available "cracking catalysts" can include, but are not limited to, the following name or brands: Akzo, Engelhard ("Flex-Tec"™ or Distributed Matrix Structures or DMS), HARMOREX (CCIC), OlefinsMAX (by Davison), Intercat, Stone & Webster, UOP and others.

Catalyst to Oil Ratio.

Increasing the concentration of catalyst in the reactor, often referred to as "cat/oil" ratio or "catalyst/oil" ratio, can increase the availability of cracking for maximum conversion. This can be achieved by increasing reactor heat load or switching to a lower coke selective (i.e., lower delta coke) catalyst. Reactor heat load can be raised by increased reactor temperature or lower feed rate. This, in turn, increases the cat/oil ratio to maintain the unit in heat balance.

In this invention, the catalyst/oil ratio [a ratio of the amount of the catalyst mixture recycled (ton/hr) to a rate of the feed oil fed (ton/hr)] is in the range of 10 to 45 wt/wt.

Carbon on Regenerated Catalyst.

The lower the carbon on regenerated catalyst ("CRC"), the higher the availability of cracking sites because less coke is blocking acid cracking sites. CRC is reduced by increasing regeneration efficiency through the use of carbon monoxide oxidation promoters. Increased regenerator bed levels also improve CRC through increased residence time but this must be balanced with reduced dilute phase disengager residence time and the possibility for increased catalyst losses.

Catalysts Feed-Rate.

Catalyst can be added periodically to the FCC unit based on a predefined production schedule. In one specific aspect of the present invention, feed catalyst can be adjusted continuously. In automated systems, however, the timing and quantity of fresh catalyst injected can be programmed into the controller with provisions for augmentation during operation of the FCC process to optimize the production yield, product mix. Due to the uncertainties associated with the production process, such as chemical make-up of the oil feed stock and other variations entering the FCC system, the emissions, energy use, the product mix may vary or drift from process targets during the course of conventional prior art fluid-cracking.

Conventional FCC systems require operators to closely monitor system outputs, and to be constantly available to make manual adjustments to the operations of the FCC systems including catalyst injection and other operating conditions as needed. Thus, it is beneficial to be able to remotely monitor and make adjustments through catalyst injections and other operating conditions to the system outputs while also reducing the reliance on human interactions such as monitoring and manual changes to the catalyst injection schedule and other process variables. In one aspect of the present invention, the fresh catalyst feed rate can be monitored and controlled by a specifically designed monitoring system. In one specific embodiment, the feed rate can be dependent on the feed composition, and the optimum feed rate can be predicted by the process models discussed in greater detail below.

Reaction Time.

An increase in reaction time available for cracking also increases conversion. Fresh feed rate, riser steam rate, recycle rate, and pressure are the primary operating variables which affect reaction time for a given unit configuration. Conversion varies inversely with the rate due to limited reactor size available for cracking. Conversion has been observed in some units to increase by only 1% absolute for a 3-5% relative decrease in fresh feed rate. As used herein, contact time means either the time between the start of contact of the feed oil with the regenerated catalysts and the separation of the produced cracked products from the catalysts, or, the time between the start of contact of the feed oil with the regenerated catalysts and the quenching, in the case that the produced cracked products are quenched just upstream of the separation zone. In a preferred embodiment, the contact time is in the range of approximately 0.1 to 1.5 seconds, and, more preferably, in the range of approximately 0.2 to 0.9 seconds. If the contact time is less than 0.1 seconds, then the light-fraction olefins will not be obtained at a high yield, because of low conversion of the heavy fraction oil. Conversely, if the contact time is longer than 1.5 sec, then the thermal cracking of petroleum oil fed can be be excessive, thereby excessively increasing the amount of dry gases generated. However, the contact time is dependent on the feed system, and the optimum reaction time can be predicted by the process models discussed in greater detail below.

Reactor Temperature.

Increased reactor temperature increases unit conversion, primarily through a higher rate of reaction for the endothermic cracking reaction and also through increased cat/oil ratio. An increase of approximately 10° F. in reactor temperature can increase conversion by approximately 1-2% absolute. Higher reactor temperature also increases gasoline octane and LPG olefinicity which are very desirable side benefits of maximizing conversion through this route. The higher octane is due to the higher rate of primary cracking reactions relative to secondary hydrogen transfer reactions which saturate olefins in the gasoline boiling range and lowers gasoline octane. Generally, an increase of approximately 10° F. in reactor temperature can give up to a 0.8 and 0.4 number increases in research and motor octane, respectively.

As used herein, "reaction outlet temperature" is defined as the outlet temperature of the down flow-type reaction zone, and is the temperature before separation of the cracked products from the catalysts. Although the reaction zone outlet temperature can be in the range of approximately 500° C. to 630° C., preferably the reaction zone outlet temperature is in the range of approximately 590° C. to 620° C. If the reaction zone outlet temperature is less than 580° C., then the light-fraction olefins can not be obtained in a high yield from residue or heavy oil cracking, while if it is greater than 630° C. then the thermal cracking of heavy fraction oil which is fed, can be significant, thereby excessively increasing the amount of dry gases generated. If naphtha is the feedstock for a particular application, the reaction temperature can be lowered compared to residue cracking to optimized propylene production. However, the reaction temperature and time are dependent on the feed system and the optimum conditions are predicted by the process model discussed in greater detail below.

Pressure.

Higher conversion and coke yield are thermodynamically favored at higher pressures; however, the conversion is not significantly affected by unit pressure because a substantial increase in pressure is required to significantly increase conversion. In certain embodiments, the FCC unit can be operated preferably at a reaction pressure of 1 to 3 kg/cm$^2$, and at a regenerating zone temperature of approximately 650° C. to 720° C.

Reactor.

The fluid catalytic cracking unit is used in this certain embodiments invention can include a regeneration zone (a regenerator), a down flow-type reaction zone (a downer reactor or "downer"), a separation zone (a separator), and a stripping zone (a stripper). The reactor can also be equipped with multiple sensors to monitor product and feed composition on-line and is integrated with a control system, as well as means to control catalyst loading and discharge real-time based on reactor performance.

Heat Balance.

Coke formation in an FCC unit can be the most critical parameter to maintain the heat balance. Coke produced in the riser or downer is burnt in the presence of air in the regenerator. The heat produced through exothermic coke burning reactions supplies the heat demands of the reactor, i.e., heat of vaporization, and associated sensible heat of the feedstock, endothermic heat of cracking, etc. For example, the coke yield in a conventional FCC unit with vacuum gas oil remains can be in the range of approximately 4.5-5.5 wt %. The heat produced from complete combustion can be sufficient to supply the reactor heat load. However, in a residue FCC unit, because the feedstock contains large amounts of coke precursors with higher amounts of Conradson coke and aromatic rings, the coke formation can be significantly increased, which in turn increases the regenerator temperature from approximately 650° C.-860° C. in conventional FCC units to approximately 720° C.-250° C. in residue crackers.

Control of Operating Conditions and Variables.

In one aspect, the invention is aimed to "optimize propylene production," which means to "maximize propylene production at the minimum cost of production." Hydrocarbon conversion in an FCC unit can be a complicated function of many variables. For example, over-cracking of gasoline to LPG and dry gas may occur due to an increase in reactor residence time. Available approaches to offset any potential over-cracking include adding additional riser steam to lower hydrocarbon partial pressure for more selective cracking, reducing reactor pressure, increasing the recycle rate to decrease residence time, reducing the availability of catalytic cracking sites by lowering cat/oil ratio, and by combinations of the foregoing conditions.

The variables described above are generally not optimized for maximizing conversion of propylene in existing FCC units. Optimum conversion level corresponds to a given feed rate, feed quality, set of processing objectives, and catalyst at other unit constraints (e.g., wet gas compressor capacity, fractionation capacity, air blower capacity, reactor temperature, regenerator temperature, catalyst circulation). Therefore, the FCC operator needs to adjust several variables at the same time. If the optimum conversion level is found, only then can the operator work on the suitable catalyst and perhaps redesign the catalyst properties to remove operating constraints to shift the operation to a higher optimum conversion level. However, there is lack of suitable automation process equipment that can be readily used to optimize such performance.

On-Line Performance Monitoring.

Regulatory control loops serve as the foundation of the plant automation hierarchy. Maintenance and control-engineering personnel struggle to sustain the performance of the conversion assets. Equipment and technology reliability issues, changing plant business drivers, and fewer skilled resources to monitor and maintain these assets are all cited as common problems. The results include negative impacts to quality, energy consumption, equipment wear and tear, plant throughput, and ultimately, profitability. Performance monitoring will provide tools to (1) benchmark current control performance against industry standards, (2) identify & prioritize problems to focus maintenance resources, (3) analyze and diagnose problems with online and offline reports, (4) improve control performance with a complete set of tools for both regulatory and advanced controllers, and (5) monitor to sustain improvements with comprehensive, automated reporting. Tools such as Matrikon's ProcessDoctor, Honeywell's LoopScout, or Yukogawa's MD Diagnostic are examples which provide such functionalities.

Modeling and Optimization Package.

Advanced software to improve throughput and control of continuous processes that have incipient disturbances can be used to optimize the FCC unit. Such software packages offer automatic control over continuous processes that are difficult to control by conventional automation techniques. There are many processes that are subject to disturbances whose onset is too fast for conventional manual or automatic control to react. The use of modeling and optimization packages results in increased throughput and reduced energy usage through superior control during normal operation, and also through avoidance or mitigation of process upsets that can shut down the process. It also requires less manual intervention from human operators responsible for the process, so they can focus their attention on higher-level production control activities. The processes of the certain embodiments of the present invention can utilize a software package, such as for example, Umetric's SIMCA P11 and the optimization tools in Matlab by MathWorks Inc.

Many of the above mentioned packages provide optimization routine which is defined as minimization of math functions which include representation of the process and product and energy costs.

Detection of Operating Conditions and Selection of Process Model.

In one specific embodiment of the present invention, the system can use various sensor signals to determine the operating conditions and select the process model that best represents the current operations. The model can be selected from a list of previously developed process models. The selected model can then be used in the optimization algorithm to calculate the optimal process settings.

In one specific embodiment, a system and method for injecting fresh catalyst into a FCC unit is provided. In one embodiment, a system for injecting catalyst into a FCC unit includes at least one catalyst injection apparatus for providing catalyst to an FCC unit, at least one sensor adapted to provide information on the composition of a product stream produced in the fluid catalyst cracking unit, and a controller coupled to the sensor, for controlling the fresh catalyst additions made by the catalyst injection system in response to the metric provided by the sensor.

In another embodiment a method for injecting a determined amount of catalyst from a catalyst injection system into a FCC unit designed to maximize olefins productions is provided that includes the steps of dispensing catalyst to a catalyst injection system into a fluid catalytic cracking unit, sensing an output in the fluid catalytic cracking unit, and automatically adjusting the amount of catalyst dispensed in response to the at least one sensed metric.

Referring now to FIG. 1, the proposed catalytic cracking process can be optionally equipped with various control systems ("Process Control"). Further, the FCC processes can be equipped with all or some of the following features, as deemed necessary as described.

The signals from a FCC unit are introduced into a Distributed Control System ("DCS"), a process control system that uses a network to interconnect sensors, controllers, operator terminals and actuators. A DCS includes a computer and has interconnections with other systems.

Model Predictive Control ("MPC"), is an advanced method of process control that improves on standard feedback control by predicting how a process such as distillation will react to inputs such as heat input. This means that feedback can be relied on much less since the effects of inputs will be derived from mathematical empirical models. Feedback can be used to correct for model inaccuracies. The controller relies on an empirical model of a process obtained by plant testing to predict the future behavior of dependent variables of a dynamical system based on past responses of the independent variables. Frequently, the controller relies on linear models of the process.

Major commercial suppliers of MPC software include the AspenTech (DMC+), Honeywell (RMPCT) and Shell Global Solutions (SMOC; Shell Global Solutions inc: Carel van Bylandtlaan 23, 2596 HP, The Hague, The Netherlands).

Control Loop Performance Monitoring ("CLMP"). Performance monitoring allows (1) benchmarking current control performance against industry standards, (2) identifying & prioritizing problems to focus maintenance resources, (3) analyzing and diagnose problems with online and offline reports, (4) improving control performance with a complete set of tools for both regulatory and advanced controllers, and (5) monitoring to sustain improvements with comprehensive automated reporting. Exemplary tools such as Matrikon's ProcessDoctor (available from Matrikon's located at 10405 Jasper Avenue, Edmonton, Alberta, Canada), Honeywell's Profit Expert (available from Honeywell International Inc., 101 Columbia Road, Morristown, N.J. 07962), or Yukogawa's MD Diagnostic (Yukogawa, Musashino-shi, Tokyo, Japan) and Aspentech's (Aspen Technology, Inc., Ten Canal Park, Cambridge, Mass.) AspenWatch provide such functionalities.

Detection of operating conditions and Selection of Process Model ("SPM"). This system uses sensor signals in the process to determine the operating conditions such as current feed rate, feed composition, and ambient temperature to select the process model that best represents the current operation. This selected process model can then be used in the optimization algorithm to calculate the optimal process settings. The tools can be developed in Matlab (Mathworks Inc., 3 Apple Hill Drive, Natick, Mass. 01760-2098), Visual Basic code or other software programming language.

Real Time Optimization and Dynamic Optimization ("RTO"). The optimization of industrial process systems is one way of adjusting the process control variables to find the reaction conditions that achieve the highest propylene yield with minimum cost or other possible outcome. Usually, many conflicting responses must be optimized simultaneously. In the lack of systematic approaches, optimization can be done by "trial-and-error" or by changing one control variable at a time while holding the rest constant. Such methods are generally not efficient in finding the true optimum. Usually, optimization techniques involve development of rigorous process models. These mathematical models can include chemical reactions and thermodynamic equations. Exemplary tools such as PAS Inc.'s (16055 Space Center Blvd., Houston, Tex. 77062, USA) NOVA provide such functionalities. The models can be validated against plant operation data to verify the model accurately represents the plant behavior. These models are dynamic in the sense they model the time of change of process variables.

Energy Management Technology ("PMS"). PMS balances energy requirements with the available energy supply, and thus prevents disturbances of operations, or even blackouts. Furthermore, the PMS can enable better control of energy costs, enhanced safety and the mitigation of environmental impacts. ABB Ltd, (Affoltemstrasse 44 P.O. Box 8131, CH-8050 Zurich, Switzerland) is believed to be one provider of such technology.

Field Bus Technology ("FFS"). The field signals used in process instrumentation have been standardized, allowing control systems and field devices from a variety of suppliers can be interconnected using standard 4 to 20 mA analog signals. The FOUNDATION Fieldbus™ standard developed by the Fieldbus Foundation™ constitutes the next level of standardization and it is designed to meet modern needs. In addition to having interconnectivity equivalent to that available using 4 to 20 mA analog signals in a conventional field network, FOUNDATION Fieldbus™ allows multiple devices to be connected to a single FOUNDATION Fieldbus™, permits the interactive communication of various types of information, and enables the distribution in the field of intelligent functions including self-diagnostics and control functionality. The focus is on its ability to transmit various types of information in addition to field signals and to distribute intelligence to distributed field devices. These features enable remote monitoring, real-time self-diagnostics, and proactive maintenance of field devices, as well as plant resource management using field communication. This can greatly reduce operating instrumentation systems costs. Emerson Corporate, (P.O. Box 4100, 8000 West Florissant Avenue, St. Louis, Mo.) is an exemplary provider of these technologies.

FCC Unit Profit and Energy Cost Calculation ("FUPEC") includes calculations that allow for using various process data, such as for example, FCC steam, catalyst, electricity and products costs to be monitored and/or calculated, thereby allowing for real-time monitoring the dollar cost per unit of products generated by the FCC unit.

In certain embodiments, the processes can be automatically monitored and adjusted as necessary. The performance monitoring of the proposed high severe fluid catalytic cracking conversion process can provide tools to: (a) benchmark current control performance against desired standards; (b) analyze and diagnose problems with online monitoring and control; (c) improve control performance with a complete set of advanced controllers and tools; (d) monitor to sustain improvements with comprehensive, automated reporting; and (e) remotely monitor using multiple sensing units and make adjustments on catalyst injections and other operating conditions to the system outputs while reducing the reliance on human interactions such as monitoring and manual changes to the catalyst injection schedule and other process variables. Such systems can be built by many commercial venders, such as those identified above, and can be integrated into the FCC unit. In certain embodiments the monitoring systems can include sensors which may be positioned throughout the FCC unit to monitor feed and product characteristics and reaction conditions. In certain embodiments, the sensors can communicate with the DCS control system via hard wired connections to the system. In certain other embodiments, the sensors can be configured to communicate with the DCS control system via wireless or RFID communication means. Thus, as shown in FIG. 3, while the DCS unit is not shown to be hardwired the flow control valves or sensors present in the FCC unit, it is understood that the DCS is operatively coupled to the FCC unit.

Figure 2:
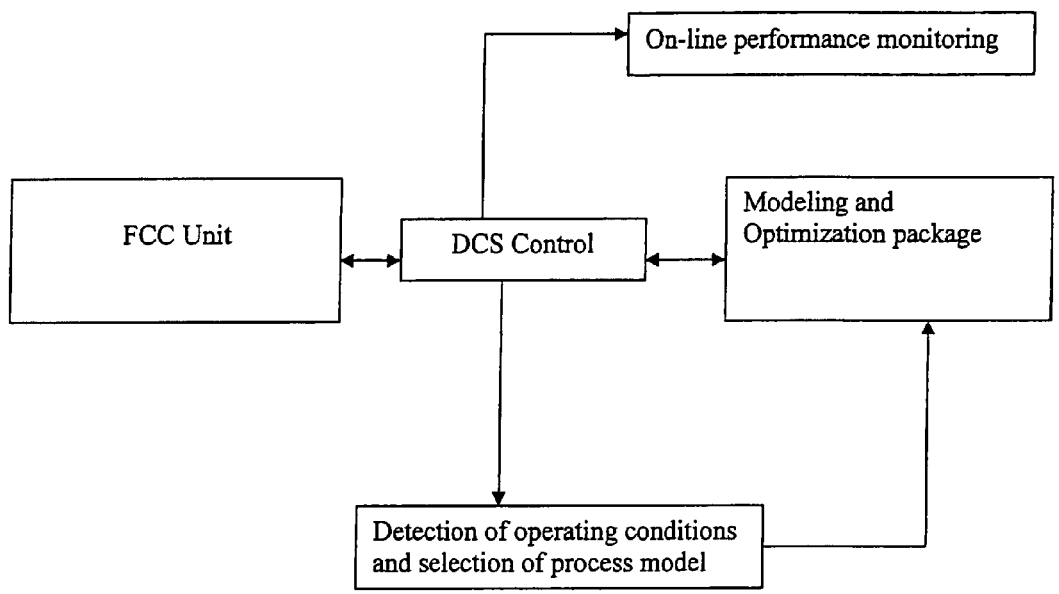
FIG. 2 is a schematic process flow diagram of an illustrative embodiment of the present invention incorporating a fluid catalytic cracking unit with a specific control system.

Referring now to FIG. 2, a general schematic illustration of an example of a fluid catalytic cracking ("FCC") unit is shown. In certain embodiments, the fluid catalytic cracking unit can include an up-flow type reaction zone.

Figure 3:
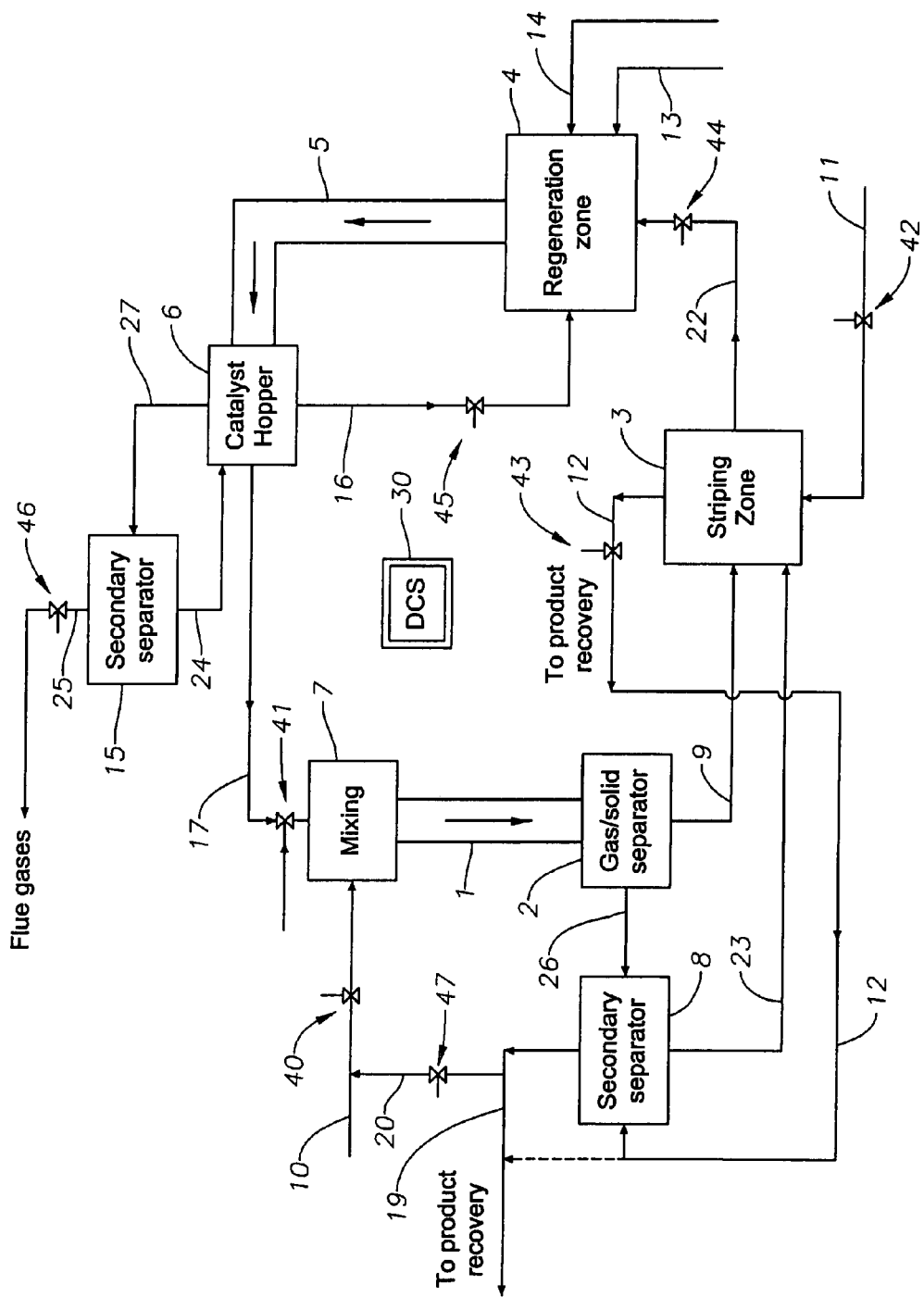
FIG. 3 is a schematic flow diagram of a generic fluid catalytic cracking process equipped with various control systems in accordance with one specific embodiment of the present invention.
Figure 4:
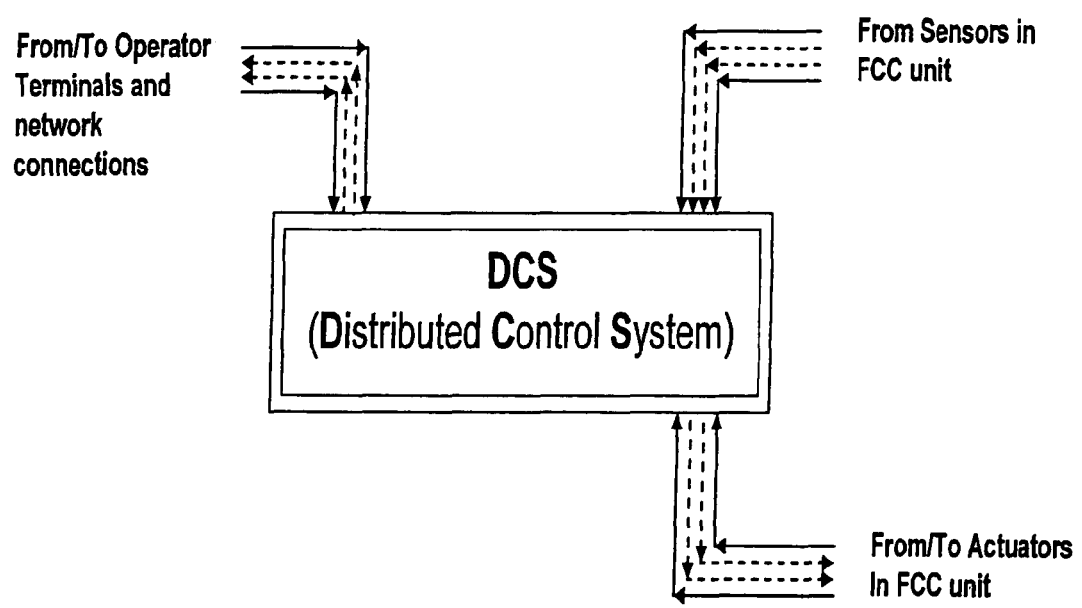
FIG. 4 is a schematic diagram of Distributed Control System utilized in one specific embodiment of the present invention.

The FCC process described herein can increase production of light olefins, including propylene, using a riser (upflow) reactor into a single separation-stripping vessel and a cracking catalyst comprising both large and medium pore, shape-selective zeolite components, as demonstrated in FIGS. 3 and 4.

FIG. 3 shows an exemplary operation of an FCC unit which can be integrated with a DCS system ("Process Control") with the goal of optimizing propylene production. The operation of the FCC unit integrated with the DCS system is provided as follows.

A gas/oil or liquid feedstock, such as for example, naphtha or hydrocarbon oil can be charged to the mixing zone 7 via line 10. The Process Control (DCS) 30 shown in FIGS. 3 and 4 can be integrated with the FCC unit and used to develop process control models. The feedstock flowing through line 10 is monitored and controlled by the DCS 30 and flow control valve 40, meaning that the control and optimization strategy will change the value of this flow target to allow more feed to the FCC unit, provided that process constraints, such as for example, valve openings, pressure, and temperature limits are respected, and provided that FCC product specifications are met. The feed 10 is mixed with the regenerated catalyst supplied from the catalyst hopper 6 to the mixing zone 7 via line 17. The amount of catalyst injected into the mixing zone 7 is controlled using a flow controller valve 41. The flow of catalyst through line 17 and flow controller 41 can be optimized using developed process models of the FCC unit and an optimization strategy designed to (a) minimize energy and catalyst cost, (b) improve FCC product quality, and (c) increase unit throughput.

The process models can be developed using operational data as well as experiments and testing on the real plants. The models utilize a mathematical relation between manipulated variables (variables that operators can change on the process) and controlled variables (process variables that will change based on changes in the manipulated variables).

The mixture falls downward through the reaction zone 1, where the cracking reaction of hydrocarbon oil takes place under high reaction temperatures and at short contact time. Then, the mixture of spent catalyst, unreacted feedstock, and products from the reaction zone 1, enters the gas-solid separation zone 2 located under the reaction zone 1. In certain embodiments, the gas-solid separation zone 2 can be a cyclone type of device. The spent catalyst is separated, in separation zone 2, from the cracked products and un-reacted feed oil. The catalyst can then be sent to the stripping zone 3 through the dip leg 9. Hydrocarbon gases separated from most of the spent catalyst can be sent to a secondary separator 8 via line 26, where the remainder of the spent catalyst can be separated from the product gas. Hydrocarbon gases are then sent to a product recovery section.

In certain embodiments, a cyclone is preferred for use as the secondary separator 8. Catalyst separated by the secondary separator 8 is directed to the stripping zone 3 via line 23 where heavy hydrocarbons adsorbed on the catalyst can be removed with a stripping gas which is introduced to the stripping zone via line 11. The flow of the stripping gas is controlled by flow control valve 42. The flow of striping gas through line 11 can be controlled and optimized in a control strategy to achieve the following (a) minimize energy and catalyst cost which is a function of catalyst deactivation, (b) improve FCC product quality, and (c) increase unit throughput.

Steam produced in a boiler, or an inert gas such as nitrogen, pressurized in a compressor, can be used as the stripping gas. The steam or inert gas used in the striping zone, can be pressurized or heated to an optimized value calculated using the process models to (a) minimize energy and catalyst cost, (b) improve FCC product quality, and (c) increase unit throughput.

For stripping conditions, in certain embodiments, a stripping temperature of 500° C. to 640° C. and a catalyst residence time of 1 to 10 minutes are preferred. The values of the striping temperature and residence can be controlled and optimized using process models to achieve (a) minimize energy and catalyst cost, (b) improve FCC product quality, and (c) increase unit throughput.

Vapors of cracked products and unreacted feed oil, stripped from the spent catalyst in the stripping zone 3, are withdrawn through line 12 located at the top of the stripping zone, together with the stripping gas. These gases are then sent to a product recovery section (not shown), or alternatively to the secondary separator 8 via line 12. Flow control valve 43 controls the flow of the gases in line 12.

The spent stripped catalyst is transferred to the regeneration zone 4 through a typical level controller by the line 22. Flow to the regeneration zone 4 can be controlled by flow controller valve 44. Fresh catalyst can be injected to the system via line 13, which can include a flow controller valve (not shown). The flow controller can be controlled and optimized to (a) minimize energy and catalyst cost, (b) improve FCC product quality, and (c) increase FCC unit throughput.

The superficial gas velocity in stripping zone 3 can be maintained within the range of 0.05 to 0.4 m/s, in order to keep the fluidized bed in the stripping zone in a bubble phase. Since the gas velocity is relatively low within the bubble phase zone, the consumption of stripping gas can be minimized. Moreover, the range of operational pressure of line 13 may be broad, during the bubble phase condition, due to the high bed density, and therefore the transportation of catalyst particles from the stripping zone 3 to the regeneration zone 4 can be facilitated. Perforated trays or other internal structures can be used in the stripping zone 3 to improve stripping efficiency between the stripping gas and the catalyst. The regeneration zone 4 is composed of a cone-shaped column connected at the top to a vertical line 5 (a riser-type regenerator). The spent catalyst is regenerated with a combustion gas (typically an oxygen-containing gas such as air) which can be fed to the regeneration zone 4 through line 14.

Regeneration is accomplished by partially or completely burning, under fluidized conditions, the carbonaceous materials (coke) produced by cracking reactions and heavy hydrocarbons which have been adsorbed on the spent catalyst.

Catalyst residence time in the regeneration zone 4 can be in the range of 1 to 5 minutes, and the superficial gas velocity can be preferably in the range of 0.4 to 1.2 m/s. The control and optimization strategy used in the automation technology can be used to calculate optimal values for the catalyst residence time and superficial gas velocity. This can be done by analyzing the operational data of the FCC unit or data obtained from FCC process testing and detecting optimal values for residence time and superficial gas velocity to achieve the following: (a) minimize energy and catalyst cost; (b) maximize propylene product quality; and (c) increase unit throughput.

After regeneration of the spent catalyst in the regeneration zone 4, the regenerated catalyst in the upper portion of the turbulent-phase fluidized bed is transferred to a riser-type regenerator 5. The regenerated catalyst from the riser-type regenerator 5 is carried to the catalyst hopper 6 located at the top of the riser type regenerator. The catalyst hopper 6, functions as a gas-solid separator, wherein the flue gases that contain the by-products of coke combustion can be separated from the regenerated catalyst and removed through secondary separator 15 via line 25. Line 25 may include a flow controller valve 46. The secondary separator is supplied via line 27. Catalyst is returned to the catalyst hopper 6 from the secondary separator 15 via line 24. In certain embodiments, the secondary separator 15 may be a cyclone.

A portion of the regenerated catalyst in the catalyst hopper 6 can be returned back to the regeneration zone 4 through a bypass line 16 equipped with flow controller valve 45. This flow controller 45, can be subjected to control and optimization to achieve (a) minimize energy and catalyst cost, (b) improve FCC product quality, and (c) increase unit throughput.

A portion of the FCC product can be taken from line 19 and/or line 12 and returned back to the mixing zone 7 via a bypass line 20, which can be equipped with a flow controller valve 47. This product recycled through line 20 and flow controller 47 can be subject to control and optimization to achieve (a) minimize energy and catalyst cost, (b) improve FCC product quality, and (c) increase unit throughput.

As described above, FCC catalyst circulates in the apparatus through a reaction zone 1, a gas-solid separation zone 2, a stripping zone 3, a regeneration zone 4, a riser-type regenerator 5, a catalyst hopper 6, and a mixing zone 7.

Another embodiment includes a method for injecting catalyst(s) from a catalyst injection system into a FCC unit designed to maximize olefins productions that includes the steps of dispensing catalyst for a catalyst injection system into a fluid catalytic cracking unit, sensing an output in the fluid catalytic cracking unit, and automatically adjusting the amount of catalyst dispensed in response to the at least one sensed response 18 and using the process models developed earlier as well as computations from the optimization routine to achieve the following: (a) minimize energy and catalyst cost; (b) maximize propylene concentration; and (c) increase unit throughput.

In addition, one or more sensors can be placed on line to monitor catalyst particles and provide on-line measurement of various desired reaction conditions and properties, including, but not limited to, reaction temperature, reaction pressure, flow rates, catalyst particle size, chemical composition of fluid streams, regeneration zone temperatures and pressures. It is understood that the sensors may be advantageously placed throughout the FCC system, as desired, to obtain certain desired reaction conditions or reaction properties. The sensors can be operatively linked to the control strategy to develop process models linking, for example, the particle size with the remaining process variables. The signal generated relating the various properties can be used to optimize the dosage of catalyst and striping gas in order to optimize the olefins production.

Preheated feedstock such as hydrocarbon oil, vacuum gas oil or naphtha, can be charged to the mixing zone 7 via line 01, which is controlled by valve inlet port 40. The feed flow through this inlet port is a control variable. The control and optimization strategy will change the value of this flow target to allow more feed to FCC unit as long as process constraints, such as valve openings, pressure and temperature limits are respected and FCC product specifications are met. This feed 10 can be mixed with the regenerated catalyst from the catalyst hopper 6 in the mixing zone 7. The amount of catalyst injected in the mixing zone 7 can be is controlled using a flow controller 17. The flow of catalyst can be optimized using developed process models of the FCC unit and an optimization strategy designed to (a) minimize energy and catalyst cost, (b) improve FCC product quality, and (c) increase unit throughput.

Another benefit of the advanced process control, as highlighted, is that the techniques that monitors output under different operating conditions, records a "fingerprint" of normal operations. The system can then detect any deviation from the fingerprint, and a database of fingerprints can be generated and used to predict what is happening to the machine. Historical data can be used to test a predictive system can provide early warning of potential equipment failure in the FCC unit. The approach can detect some problems earlier than they would have shown up using conventional monitoring.

Comparative examples to demonstrate the benefit of using Advanced Process Control and Monitoring are discussed below. Using the trial system and data reported U.S. Published Patent Application Publication No. US 2002/0195373 A1, published on Dec. 26, 2002, the contents of which are hereby incorporated by reference, Case A, which represents the prior art, was conducted without advance Process Control and Monitoring tools. The cited trial conditions and results are provided below:

| | |
|---|---|
| Feed: | Hydrodesulfurized Arabian Light vacuum gas oil |
| Catalyst: | HARMOREX (CCIC) |
| Reaction zone temperature: | 600° C. |
| Reaction pressure: | 1.0 Kg/cm$^2$G |
| Catalyst to Oil ratio: | 15.5 wt/wt |
| Contact time: | 0.4 seconds |
| Regeneration zone catalyst temperature: | 720° C. |

Case A Results:

| | |
|---|---|
| Conversion (in wt %) | 95.6% |
| Yield of (in wt %): | |
| Dry gas | 4.1 |
| Propylene | 18.2 |
| Butenes | 22.5 |
| Gasoline | 42.5 |
| LCO+ | 4.4 |
| Coke | 1.0 |

Case B, also provided in the foregoing patent application and conducted without any advance Process Control and Monitoring tools, was also conducted. Case B differs from Case A as follows:

| | |
|---|---|
| The Reaction zone outlet temperature | 600° C. |
| Hydrogen partial pressure | 65 Kg/cm²G |
| Catalyst/Oil ratio | 14.9 wt/wt |

Case B Results:

| | |
|---|---|
| Conversion (in wt %): | 86.3% (Comparative example 2) |
| Yield of (in wt %): | |
| Dry gas | 3.8 |
| Propylene | 11.3 |
| Butenes | 15.0 |
| Gasoline | 48.7 |
| LCO+ | 13.7 |
| Coke | 2.7 |

Case C was conducted in accordance with the disclosure and teachings contained herein and include application of advance Process Control and Monitoring tools.

Case C Results Include:

| | |
|---|---|
| Conversion (in wt %) | 97.6% (Example with APC) |
| Yield of (in wt %): | |
| Dry gas | 4.2 |
| Propylene | 18.7 |
| Butenes | 22.95 |
| Gasoline | 41.65 |
| LCO+ | 4.3 |
| Coke | 0.98 |

The benefits of using automation and monitoring tools, as set out in Case C include, but are not limited to, the following. As can be seen in Case A and Case B, the conversion rate varied from 86.3% to 95.6%, and the propylene yield ranged from 11.3 to 18.7, representing approximately an 11% variation in conversion rate and approximately a 65% variation in propylene yield by changing operating conditions, mainly catalyst to oil ratio and reactor temperature. This shows a high potential for improvements using on-line monitoring and advance control strategies proposed in the present invention.

The following increases are only some of the benefits achieved by advanced control: increase in unit throughput al least 3%; and product quality variability reduction at least 10%.

The example above demonstrates that the conversion, as well as desired product yields of propylene can be optimized with minimum energy input with the benefit of advanced process control. In this particular case advanced control and monitoring tools improved the yield of around 2%, increased process throughput, reduced production variability by 10% and energy reduction of 3% over base case.

In one specific aspect, a process for the fluid catalytic cracking of petroleum oil is provided. The process comprises the step of: (a) maintaining 55 to 95 wt % of a base cracking catalyst containing a stable Y-type zeolite, with less than 0.6 wt % of rare-earth metal oxide, and 5 to 40 wt % of an additive containing a shape-selective zeolite and around 10 wt % of a phosphorus-containing activated ex situ, calculated as $P_2O_5$ based on the total amount of olefin-selective zeolite; (b) reacting the said mixture of 500° C. to 650° C. for a duration in the range of 0.05 to 1.2 sec a down-flow type of fluid catalytic cracking apparatus having a regeneration zone, a separation zone and a stripping zone; (c) controlling the fresh catalysts federate by a process control; (d) separating the a part of product streams and recycling a part of the unconverted material mixed with the feed stream; (e) monitoring on-line continuously the feeds and products characterization data, and operating conditions; (f) developing process models based on the observations obtained in step (e); (g) comparing process performance by the model prediction; and (h) adjusting the operating conditions to yield optimize propylene production using the model in step (g).

A further feature of the process is that the reaction zone outlet temperature can be greater than 500° C. Another feature of the process is that the contact time of hydrocarbons in the reaction zone can be in the range of 0.05 to 1.5 seconds. An additional feature of the process is that the feedstock composition, product composition and operating conditions can be monitored and utilized to develop process model which is then used to maximize propylene yield. Still another feature of the process is that the fluid catalytic cracking apparatus can be operated with the catalyst/oil ratio of 10 to 42 wt/wt. A further feature of the process is that the rare-earth metal oxide content in the base cracking catalyst can be less than 0.6 wt %. Another feature of the process is that the rare-earth metal oxide content in the base cracking catalyst can be less than 0.08 wt %. An additional feature of the process is that the zeolite content in the base cracking catalyst can be in the range of 5 to 55 wt % and ZSM-5 is an additive. Still another feature of the process is that the petroleum oil can include an oil selected from the group consisting of naphtha, crude oil, deasphalted oil, vacuum gas oil, gas oil, petroleum residua, and the corresponding hydrotreated products, and mixtures thereof.

In another aspect, a process for producing at least one light olefin product is provided. The process includes the steps of: (a) contacting a feedstock that includes a hydrocarbon mixture at a temperature of over 525° C. and a pressure of 1 to 5 atmospheres; (b) mixing cracking catalyst wherein the said catalyst comprises a ZSM-5 zeolite catalyst which contains 0.5 to 10 weight percent phosphorus and 0.1 to 10 weight percent of a promoter metal; and (c) maintaining the on-line reactor conditions guided by a process controller designed to optimize propylene production.

A further feature of the process is that multiple sensing equipment can analyze feedstock and product yield composition on-line. Another feature of the process is that the optimum processing conditions can be determined by process models and optimization routines.

In an additional aspect, a process for the fluid catalytic cracking of petroleum oil is provided, wherein the petroleum oil is composed of naphtha. The process includes the steps of: (a) contacting the oil with a cracking catalyst mixture; (b) reacting the said mixture in step (a) in a of fluid catalytic cracking apparatus having a regeneration zone, a separation zone and a stripping zone, temperature in the range of 525° C. to 650° C., the catalyst/oil ratio is in the range of 10 to 42 wt/wt, and the contact time of hydrocarbons in the reaction zone is in the range of 0.05 to 1.2 sec; (c) monitoring the fresh catalysts feed rate in the mixture, feed and product characterization data, as well as operating process conditions data; (d) using the data to develop process models and controlled optimization routines for different operating regimes; (e) adjusting and modifying the models by the of use of historical process data with a goal to maximize the yield of propylene production at a minimum operating cost; and (f) separating, recovering, and recycling of at least a portion of the lighter naphtha cracked material mixed with feed, in which it is catalytically cracked into products comprising additional propylene, with a goal to maximize the yield of propylene production at a minimum operating cost.

A further feature of the process is that the feedstock composition, product composition and operating conditions can be monitored and utilized to develop statistical model which can then be used to maximize propylene yield. Another feature of the process is that the extent of recycling of the unconverted in (f) can be estimated by the process model in (d).

In yet another aspect, a process for the fluid catalytic cracking of petroleum oil is provided, wherein the petroleum oil is composed of petroleum heavy oil. The process includes the steps of: (a) contacting the petroleum oil with catalyst mixtures consisting of a base cracking catalyst containing a stable Y-type zeolite and of rare-earth metal oxide, and an additive containing a shape-selective zeolite; (b) contacting the mixture in a fluid catalytic cracking apparatus having a regeneration zone, a separation zone and a stripping zone; (c) heating the mixture under conditions that the reaction zone outlet temperature is in the range of 500° C. to 650° C.; (d) remotely monitoring on-line wherein the feed catalysts rate, feed oil and product yield and characterization data as a function of operating process conditions to use the data received for developing process control models for different operating regimes; (e) refining the models by the of use of data obtained from process testing wherein the process testing including deviating the normal process condition to develop resulting process data with a goal to maximize the yield of propylene production at a minimum operating cost; (f) separating, recovering and recycling of at least a portion of the un-cracked material which is mixed with feed oil which it is then catalytically cracked into products comprising additional propylene; and (g) providing the process with a system for injecting catalyst which includes at least one catalyst injection apparatus and at least one sensor adapted to allow determining the composition of the propylene product stream produced in the fluid catalyst cracking unit, and a controller coupled to the sensor, for controlling the catalyst injection system in response provided by the sensor and using the process models and computations from the optimization routine to achieve minimize energy and catalyst costs while maximizing FCC product quality and throughput.

In still another aspect, a process for the fluid catalytic cracking of a heavy-fraction oil is provided, which includes the steps of contacting the oil with a catalyst mixture consisting of 60 to 95 wt % of a base cracking catalyst containing a stable Y-type zeolite and less than 0.5 wt % of rare-earth metal oxide, and 5 to 40 wt % of an additive containing a shape-selective zeolite, the contacting taking place in a fluid catalytic cracking apparatus having a regeneration zone, a down low-type reaction zone, a separation zone and a stripping zone, and under conditions that the reaction zone outlet temperature is in the range of 580° C. to 630° C., the catalyst/oil ratio is in the range of 10 to 45 wt/wt, and the contact time of hydrocarbons in the reaction zone is in the range of 0.1 to 1.5 second wherein the fresh catalyst feed rate, and feed oil rate and product characterization data as functions of operating process conditions are remotely monitored on-line and the resulting data are used to develop different process models for different operating regimes. The process includes the steps of: (a) validating the said models by process testing with a goal to maximize the yield of propylene production at a minimum operating cost; (b) separating, recovering and recycling of at least a portion of the unconverted material mixed with feed which it is then catalytically cracked into products comprising additional propylene; (c) wherein the recycling is optimized by the use of said process model; and (d) equipping the process with a system for injecting fresh catalyst which includes at least one catalyst injection apparatus and at least one sensor adapted to determine the composition of an olefin stream produced in the fluid catalyst cracking unit, and a controller coupled to the sensor, for controlling the additions made by the catalyst injection system in response to the metric provided by the sensor with a goal to maximize the yield of propylene production at a minimum operating cost.

A further feature of the process is that the heavy fraction oil can include an oil selected from the group consisting of heavy crude oil, deasphalted oil, vacuum gas oil, petroleum residua, and the corresponding hydrotreated products, and mixtures thereof.

In a further aspect, a process for the fluid catalytic cracking of petroleum oil is provided, wherein the petroleum oil is composed of petroleum gas oil or heavy oil. The process includes the steps of: (a) contacting the oil with a catalyst mixture consisting of a base cracking catalyst containing a stable Y-type zeolite and of rare-earth metal oxide, and an additive containing a shape-selective zeolite; (b) introducing the mixture for contacting in a fluid catalytic cracking apparatus having a regeneration zone, a separation zone and a stripping zone; (c) cracking the mixture under conditions that the reaction zone outlet temperature is in the range of 500° C. to 650° C.; (d) monitoring on-line and real-time remotely the feed rate, feed and product characterization data as a function of operating process conditions and using the resulting data are for developing statistical process models for different operating regimes; and (e) refining the use of historical process data with a goal to maximize the yield of propylene production at a minimum operating cost.

A further feature of the process is that at least a portion of the unconverted cracked material can be recycled which it is ultimately catalytically cracked into products comprising additional propylene. Another feature of the process is that the process can be provided with a system for injecting catalyst which includes a catalyst injection system apparatus and at least one sensor adapted to provide a indicative of the composition of a product stream produced in the catalyst cracking unit, and a process model coupled to the sensor, for controlling the additions made by the catalyst injection system in response to the response provided by the optimization process model. An additional feature of the process is that the petroleum oil can include an oil selected from the group consisting of naphtha, crude oil, deasphalted oil, vacuum gas oil, petroleum residua, and the corresponding hydrotreated products, and the mixtures thereof.

In another aspect, the present invention is directed to a process for the fluid catalytic cracking of heavy fraction oils. The process includes the steps of: (a) feeding the heavy fraction oils to a down flow reaction zone inlet to bring the heavy fraction oils into contact with a regenerated catalyst, with the catalytic cracking being carried out under conditions of a contact time of 0.1 to 3.0 sec, a reaction zone outlet temperature over 500° C. and a catalyst/oil ratio of 10 to 50 wt/wt to obtain a mixture of cracked product, unreacted material and spent catalyst, and separating spent catalyst from the mixture; stripping the hydrocarbon from the catalyst in a stripping zone, obtaining the regenerated catalyst in a regeneration zone, and recycling the regenerated catalyst at the reaction zone inlet; (b) cracking the said mixture under conditions that the reaction zone outlet temperature is in the range of 500° C. to 650° C.; (c) monitoring on-line and real-time remotely the feed rate, feed and product characterization data as a function of operating process conditions and using the resulting data for developing process models for different operating regimes; (d) refining by the of use historical process data with a goal to maximize the yield of propylene production at a minimum operating cost; (e) recycling of at least a portion of the unconverted cracked material mixed with feed which it is ultimately catalytically cracked into products comprising additional propylene; (f) providing the process with a system for injecting catalyst which includes at least one catalyst injection apparatus and at least one sensor adapted to provide a composition of a product stream generated in the catalyst cracking unit, and a controller coupled to the sensor, for controlling the fresh catalyst injection system in response to the metric provided by the sensor, wherein the catalyst addition flow control valve opening is determined by the signal that is calculated in a DCS control loop with an aim to optimize propylene production.

A further feature of the process is that the petroleum oil can include an oil selected from the group consisting of naphtha, crude oil, deasphalted oil, vacuum gas oil, petroleum residua, and the corresponding hydrotreated products, and the mixtures thereof.

In yet another aspect, a process for the fluid catalytic cracking of heavy fraction oils is provided. The process includes the steps of: (a) feeding the heavy fraction oils to a down flow reaction zone inlet to bring the heavy fraction oils into contact with a regenerated catalyst, with the catalytic cracking being carried out under conditions of a contact time of 0.1 to 3.0 sec, a reaction zone outlet temperature over 500° C. and a catalyst/oil ratio of 10 to 50 wt/wt to obtain a mixture of cracked product, unreacted material and spent catalyst, and separating spent catalyst from the mixture; stripping the hydrocarbon from the catalyst in a stripping zone, obtaining the regenerated catalyst in a regeneration zone, and recycling the regenerated catalyst at the reaction zone inlet; (b) cracking the mixture under conditions that the reaction zone outlet temperature is in the range of 500° C. to 650° C.; (c) monitoring on-line and real-time remotely the feed rate, feed and product characterization data as a function of operating process conditions and using the resulting data are developing process models for different operating regimes; (d) refining the model by the of use historical process data and plant testing with a goal to maximize the yield of propylene production at a minimum operating cost; (e) recycling of at least a portion of the unconverted cracked material mixed with feed which it is ultimately catalytically cracked into products comprising additional propylene; (f) providing the process with a system for injecting catalyst which includes at least one catalyst injection apparatus and at least one sensor adapted to provide a indicative of the composition of a product stream produced in the catalyst cracking unit, and a controller coupled to the sensor, for controlling the additions made by the catalyst injection system in response to the metric provided by the sensor; and (g) optimize the fluid cracking process variables in order to maximize the olefin quality and feed flow by the use of advanced control strategy and an on-line sensor which is used to analyze the FCCU product wherein the advanced control uses one or more sensed variables, actuator positions as well as process models and economic variables including unit feed cost, intermediate products, steam unit cost, catalyst cost and other parameters related to the cost of operation.

A further feature of the process is that the petroleum oil can include an oil selected from the group consisting of naphtha, crude oil, deasphalted oil, vacuum gas oil, petroleum residua, and the corresponding hydrotreated products, and the mixtures thereof. Another feature of the process is that a particles size sensor can be provided to monitor the size of FCC spent catalyst on line to provide on-line measurement, wherein the signal is linked to the control strategy to develop process models linking this particles size with the remaining process variables. An additional feature of the process is that the particle size particles signal can be used to optimize the dosage of catalyst and striping gas in order to optimize the olefins production.

Having described the invention with reference to particular compositions, theories of effectiveness, etc., it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary. The specific process examples herein disclosed are to be considered as being primarily illustrative. Various changes beyond those described will no doubt occur to those skilled in the art; and such changes are to be understood as forming a part of this invention insofar as they fall within the spirit and scope of the claims.

What is claimed is:

1. A process for the production of propylene by the fluid catalytic cracking of petroleum oil feedstock, the process comprising the steps of:
   contacting the oil feedstock with a cracking catalyst mixture, the cracking catalyst mixture comprising:
      55 to 95 wt % of a base cracking catalyst comprising a stable Y-type zeolite and less than 0.6 wt % of rare-earth metal oxide,
      5 to 45 wt % of an additive comprising a shape-selective zeolite, and
      0.5 to 10% by weight of a phosphorus-containing compound;
   reacting the cracking catalyst mixture and oil feedstock in a reaction zone of a down-flow type fluid catalytic cracking apparatus having a regeneration zone, a first separation zone, a stripping zone, and a catalyst injection system, said fluid catalytic cracking apparatus maintained at a temperature of between 500° C. and 650° C. and a contact time of approximately 0.05 to 3.0 seconds, to obtain a mixture of a propylene product stream, unreacted oil feedstock and spent catalyst, wherein the propylene product stream comprises an increased amount of propylene as compared to an amount of propylene in the feed stream;
   wherein the catalyst/oil ratio in the fluid catalytic cracking apparatus is between 10 to 50 wt/wt;
   wherein the catalyst injection system comprises at least one catalyst injection apparatus, at least one sensor adapted to determine the propylene product stream composition, and a controller coupled to the system, wherein the catalyst injection system controls catalyst injection in response to a signal from the at least sensor;
   wherein the addition of oil feedstock and catalyst to the reaction zone is controlled by a process control; and separating and collecting the propylene product stream from the spent catalyst and unreacted oil feedstock in the stripping zone;

regenerating spent catalyst in the regeneration zone;

withdrawing a stream comprising the propylene product stream and the unreacted oil feedstock from the stripping zone; and recycling at least a portion of the propylene product stream from the stream withdrawn from the stripping zone, through a second separation zone before sending the recycled portion of the propylene product stream to the reaction zone, wherein the process control comprises the steps of:
continuously monitoring feed data, products characterization data and operating conditions;
developing process models based on the feed data, products characterization data and operating conditions monitored;
comparing process performance with the process models; and
adjusting operating conditions to optimize propylene production.

2. The process of claim 1 wherein the separation zone comprises a cyclone separator and the fluid catalytic cracking apparatus further comprises a secondary separator coupled to the separation zone and a catalyst hopper for supplying fresh catalyst to the reaction zone.

3. The process of claim 1 wherein the reaction zone outlet temperature is greater than 500° C. and wherein the reaction of the cracking catalyst mixture and the oil feedstock is at a pressure of between 1 and 5 atmospheres.

4. The process of claim 1 wherein the feedstock composition, product composition and operating conditions can be monitored and utilized to a develop process model which is then used to maximize propylene yield.

5. The process of claim 1 wherein the rare-earth metal oxide content in the base cracking catalyst is less than 0.08 wt % and wherein the base cracking catalyst comprises between 0.1 to 10 weight percent of a promoter metal.

6. The process of claim 1 wherein the petroleum oil feedstock is selected from the group consisting of an oil selected from the group consisting of naphtha, crude oil, deasphalted oil, vacuum gas oil, gas oil, petroleum residua, hydrotreated petroleum oil products, and mixtures thereof.

7. A process for the production of propylene by the fluid catalytic cracking of a petroleum oil feedstock, comprising:
contacting the petroleum oil feedstock selected from the group consisting of straight-run gas oil, vacuum gas oil, atmospheric residue, vacuum residue, coker gas oil and petroleum oils obtained by hydrofining or hydrotreating said residues and gas oils, and mixtures thereof, with a cracking catalyst mixture, the cracking catalyst mixture comprising:
55 to 95 wt % of a base cracking catalyst comprising an ultra stable Y-type zeolite and less than 0.5 wt % of rare-earth metal oxide,
5 to 45 wt % of an additive comprising a shape-selective zeolite,
between 0.5 and 10% by weight of a phosphorus-containing compound; and
between about 0.1 and 10% by weight of a promoter metal selected from the group consisting of gallium, germanium, tin, and mixtures thereof;
reacting the cracking catalyst mixture and oil feedstock in a reaction zone of a down-flow type fluid catalytic cracking apparatus having a regeneration zone, a first separation zone, and a stripping zone maintained at a temperature of between 500° C. and 650° C. and a contact time of approximately 0.05 to 1.2 seconds, to obtain a mixture of a propylene product stream, unreacted petroleum oil feedstock, and spent catalyst, wherein the propylene product stream comprises an increased amount of propylene as compared to an amount of propylene in the feed stream;

wherein the addition of petroleum oil feedstock and fresh catalyst to the reaction zone is controlled by a process control;

separating and collecting the propylene product stream from the spent catalyst and unreacted petroleum oil feedstock in the stripping zone;

withdrawing a stream comprising the propylene product stream and the unreacted oil feedstock from the stripping zone; and recycling at least a portion of the propylene product stream from the stream withdrawn from the stripping zone, through a second separation zone before sending the recycled portion of the propylene product stream to the reaction zone, wherein the process control comprises the steps of:
continuously monitoring feed characterization data, propylene products characterization data, catalyst particle size, and operating conditions;
developing process models based on the feed characterization data, propylene products characterization data and operating conditions monitored;
comparing process performance with the process models; and
automatically adjusting operating conditions based upon the comparison of the process performance and the process models to optimize propylene production and minimize associated production costs.

8. The process of claim 7, wherein the process control further comprises the step of sensing an output in the fluid catalytic cracking unit and adjusting the amount of catalyst dispensed in response thereto.

9. The process of claim 1, wherein the process control further comprises the step of balancing energy requirements with available energy supply.

10. The process of claim 1 wherein the process control further comprises the step of real-time monitoring of the dollar cost per unit of products generated by the FCC unit.

11. The process of claim 1 wherein the process control is configured to communicate with sensors positioned throughout the FCC unit, wherein said sensors monitor feed and product characteristics and reaction conditions.

12. The process of claim 1 wherein sensors within the FCC unit communicate on-line measurement of the reaction temperature, reaction pressure, flow rates, catalyst particle size, chemical composition of fluid streams, regeneration zone temperatures and regeneration zone pressures to the process control, and wherein the process control optimizes the catalyst dosage and olefin production.

13. The process of claim 1 wherein the process control further comprises the steps of estimating the extent of recycling of the unreacted oil feedstock.

14. The process of claim 1 further comprising the step of refining the process models using data obtained from process testing wherein the process testing comprises deviating a normal process condition to develop resulting process data.

15. The process of claim 1 further comprising using process models and computations to achieve minimum energy and catalyst cost while maximizing product quality and throughput.

16. The process of claim 1 wherein the step of recycling of the unreacted oil feed is optimized by the process control.

17. The process of claim 1 further comprising the step of controlling the opening of a catalyst addition flow control valve by the process control.

18. The process of claim 1 further comprising the steps of on-line and real-time remotely monitoring the feed rate, feed characterization data and propylene products characterization data as a function of the operating process conditions, and using the data to develop process models for different regimes.

* * * * *